June 14, 1927.
E. A. HUBBARD
1,632,651
FLEXIBLE SPOTTER FOR REPAIRING TIRE CASINGS
Filed July 20, 1926
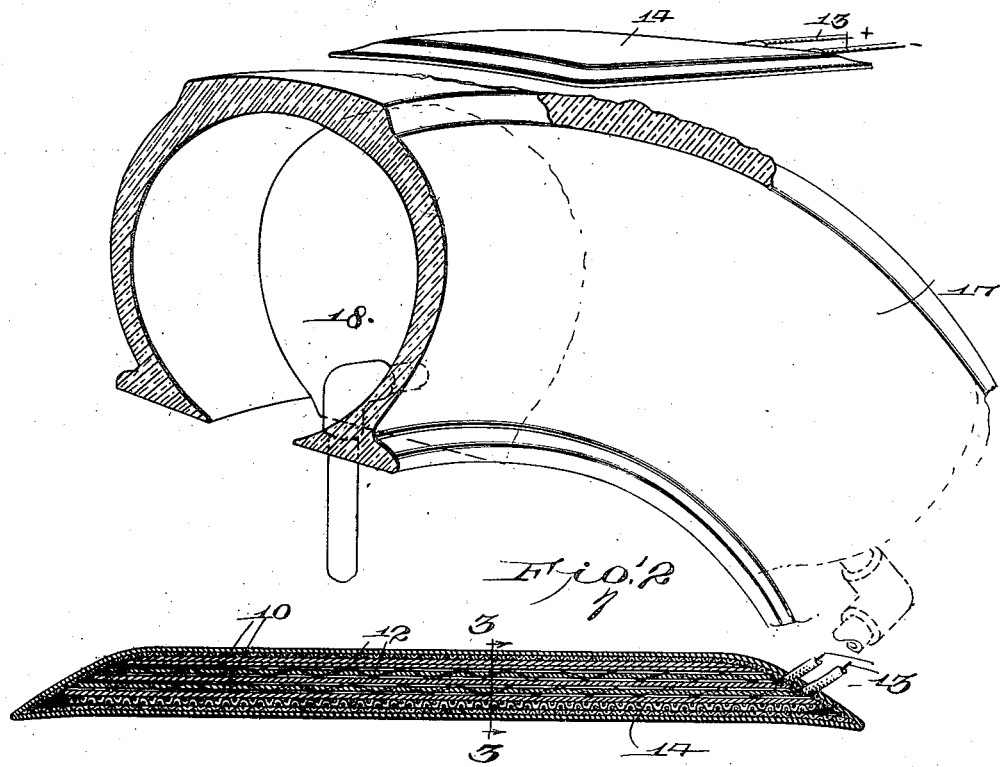
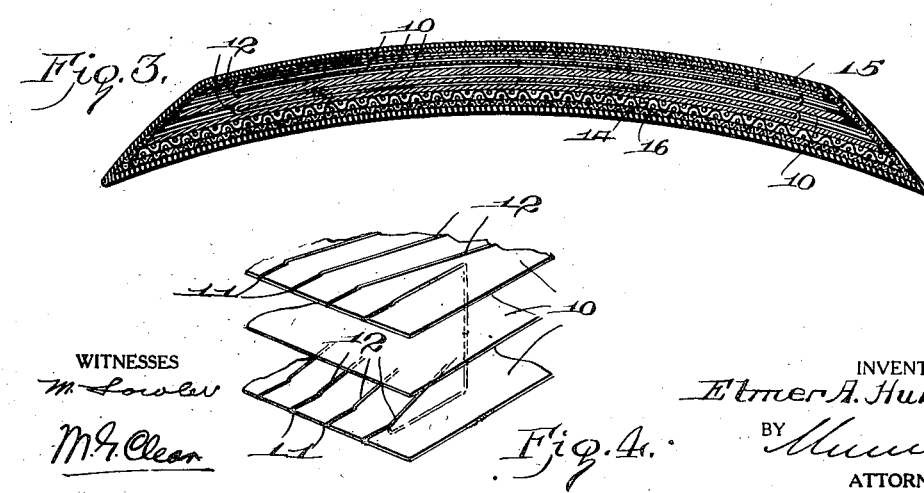
WITNESSES
INVENTOR
Elmer A. Hubbard
BY
ATTORNEYS Patented June 14, 1927.

1,632,651

UNITED STATES PATENT OFFICE.

ELMER A. HUBBARD, OF FLAGSTAFF, ARIZONA.

FLEXIBLE SPOTTER FOR REPAIRING TIRE CASINGS.

Application filed July 20, 1926. Serial No. 123,732.

My present invention relates generally to devices for the repair of pneumatic tires, and more particularly to what are generally known as outside spotters employed against the external surface of a pneumatic tire casing and held against and over unvulcanized rubber by virtue of windings around the tire casing and around the spotter applied thereto. Ordinarily such spotters are of metallic rigid form requiring sets or numbers thereof to conform to different contours, the winding serving to hold the spotter under considerable pressure against the external surface of the casing to be repaired within which a heating core is used. The spotter is also heated and thus between the heated core and the spotter the unvulcanized rubber applied to the point at which the repair is desired, will be vulcanized and cured.

It is a primary object of my invention to provide a flexible spotter which will accommodate itself to the various contours presented in work of this character and which will bring about uniform even contact with the place to be repaired, and will, in addition, be strong and durable as well as effective and efficient in use.

In the accompanying drawing which illustrates my present invention and forms part of this specification:—

Figure 1 is a sectional perspective view illustrating the practical application of my invention;

Figure 2 is a central vertical longitudinal section through a spotter such as proposed by my invention;

Figure 3 is a vertical transverse section taken substantially on line 3—3 of Fig. 2, and, Figure 4 is a detail sectional view showing certain portions of the device which support the heating coil.

Referring now to these figures my invention purposes an outside spotter which is flexible throughout in order that it may accommodate itself to various tire surface contours depending upon the particular place required to be repaired in a tire, and which includes a series of layers 10 of fire proof material such as sheet asbestos, certain of which layers are provided along their opposite edges with a plurality of spaced slits extending therein from their side edges, these slits being best shown at 11 in the detail Fig. 4. The slits 11 thus formed are adapted to receive the convolutions 12 of heating coils, of which I have shown two such coils connected by virtue of the passage of a connecting wire through an asbestos sheet interposed between the coils so as to avoid short circuiting. In this way the lead-in and return wires, as indicated at 13 in Figs. 1 and 2 may be disposed adjacent to one another at the same end of the body of the spotter.

The flexible body of the spotter also includes a reinforcing layer beneath the several layers of fire proof material 10, and preferably in the nature of a closely woven wire mesh 14, having sufficient strength to resist an acute bending of the flexible body while at the same time permitting of its ready flexure to the various contours above mentioned. In this way I avoid ready breakage of the fine wire forming the heating coils and at the same time interpose a member between the coils and the rubber to be vulcanized which will have the effect of evenly distributing the heat, since the wire mesh 14 is a fair conductor of heat.

The several layers of fire-proof material and the reinforcing layers of woven wire are preferably enclosed in a flexible envelope and as shown, this envelope may consist of an inner layer of tough fabric 15 suitable for the purpose, and an outer layer of cured or vulcanized rubber 16 which will avoid all seams and will render the body moisture-proof without impairing its heat conducting or distributing properties.

The coils are of course electrically heated and the flexible spotter thus constructed is utilized in practice upon a tire which is indicated at 17 in Fig. 1, by applying the spotter to that portion of the tire to be repaired. An inner steam, or other heated core 18, is utilized within the tire 17, and the flexible body of the spotter is bound to the external surface of the tire by windings, preferably of tape or similar material, which will result in holding the spotter under considerable pressure against that portion of the tire to which raw or unvulcanized rubber has been placed for repair purposes. The coils within the spotter being then heated, will distribute the necessary heat through the body of the spotter for the curing or vulcanization of the raw rubber, especially in conjunction with the heat of the core 18, and it is obvious that with my improved spotter, but a single unit or construction is necessary, irrespective of the varying sizes and surface contours such as are employed at the present time. My invention does away with the necessity for the sets of variously shaped rigid spotters now utilized, and insures more even uniform contact with the raw or unvulcanized rubber and the adjacent portion of the surface of a tire to be repaired.

I claim:

1. A spotter for use in tire casing repairs, consisting of a flexible body adapted to accommodate itself to various surface contours and including a series of layers of fire proof material, a flexible reinforcing layer, a flexible enclosing envelope, and a heating coil supported by and between certain of the fire proof layers.

2. A spotter for use in tire casing repairs consisting of a flexible body adapted to accommodate itself to various surface contours including a heating coil, fire proof means to support the coil, a substantially flat reinforcing layer arranged to permit flexure of the body, and resist acute bending, and a flexible envelope enclosing the coil, coil support and reinforcing layer, as described.

3. A spotter for use in tire casing repairs consisting of a flexible body adapted to accommodate itself to various surface contours including a series of layers of fire proof material, a flexible reinforcing layer, and a flexible enclosing envelope, certain of the fire proof layers having slits extending therein from opposite edges thereof, and a heating coil the convolutions of which are extended in and guided by the said slits.

4. A spotter for use in tire casing repairs, consisting of a flexible body adapted to accommodate itself to various surface contours and including a series of layers of fire proof material, a layer of woven wire for reinforcing the body, a heating coil supported by the layers of fire proof material and insulated thereby from the wire reinforcement, and a flexible envelope enclosing the fire proof material, coil and reinforcement.

5. A spotter for use in tire casing repairs, consisting of a flexible body adapted to accommodate itself to various surface contours and including a series of layers of fire proof material, a layer of woven wire for reinforcing the body, a heating coil supported by the layers of the fire proof material and insulated thereby from the wire reinforcement, and a flexible envelope enclosing the fire proof material, coil and reinforcement, said envelope having an outer moisture proof covering, as described.

ELMER A. HUBBARD.